United States Patent
Kurihara et al.

[11] Patent Number: 5,998,009
[45] Date of Patent: Dec. 7, 1999

[54] MAGNETIC RECORDING MEDIUM

[75] Inventors: Kenichi Kurihara; Masafumi Ata; Mayumi Miyashita; Noriyuki Kishii; Takahiro Kamei, all of Kanagawa, Japan

[73] Assignee: Sony Corporation, Tokyo, Japan

[21] Appl. No.: 08/948,480

[22] Filed: Oct. 10, 1997

[30] Foreign Application Priority Data

Oct. 15, 1996 [JP] Japan .................................. P08-272720

[51] Int. Cl.$^6$ .................................................. G11B 5/712
[52] U.S. Cl. ..................................... 428/323; 428/694 BA; 428/900
[58] Field of Search ........................... 428/694 BA, 900, 428/323; 252/62.54

[56] References Cited

U.S. PATENT DOCUMENTS

| | | | |
|---|---|---|---|
| 4,092,256 | 5/1978 | Goodson et al. | 252/62.54 |
| 4,885,208 | 12/1989 | Araki et al. | 428/403 |
| 5,587,232 | 12/1996 | Hayashi et al. | 428/323 |

FOREIGN PATENT DOCUMENTS 938313   6/1982   U.S.S.R. .

*Primary Examiner*—Stevan A. Resan
*Attorney, Agent, or Firm*—Hill & Simpson

[57] ABSTRACT

The present invention provides a magnetic recording medium having a magnetic layer comprising a ferromagnetic powder dispersed in a binder so as to exhibit an excellent electromagnetic property.

The magnetic recording medium has a magnetic layer formed on a non-magnetic body, from a magnetic paint mainly consisting of a ferromagnetic powder and a binding agent. This magnetic layer also contains a metal chelate compound of a diketone shown in Chemical Formula given below:

[Chemical Formula 1]

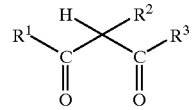

wherein $R^1$ to $R^3$ are selected from a group consisting of hydrogen, halogen, hydroxyl group, nitro group, carboxyl group, carbonyl group, amino group, amide group, and sulfonic acid group as well as alkyl group, aryl group, hetero-aromatic group replaced therewith and wherein the metal of the chelate compound is Ti, Zr, Ni, Sn, Co, or Cr.

5 Claims, 2 Drawing Sheets

GLOSSINESS DEPENDENCE ON
DISPERSION PERIOD OF TIME

MAGNETIC RECORDING MEDIUM

BACKGROUND OF THE INVENTION

1. Field of the Invention

The present invention relates to a magnetic recording medium of paint type and, in particular, to a magnetic recording medium having an excellent dispersing ability of a magnetic powder.

2. Description of the Prior Art

Magnetic recording medium are widely used in the forms of audio tapes, video tapes, backup data cartridges. floppy disks and the like. For these magnetic recording media, discussions are going on so as to obtain a higher density such as shorting the recording wave length, requiring an improvement of electromagnetic conversion property.

In the paint type magnetic recording medium, in order to attain a high density recording, there are considered various techniques such as a use of a ferromagnetic alloy powder as the ferromagnetic powder, refining of the ferromagnetic powder, increase of the coercive force of the ferromagnetic powder and uniform distribution thereof, and a mirror finished surface of a magnetic layer. At present, the magnetic material has been significantly improved and it is possible to obtain a ferromagnetic powder having a saturation magnetization exceeding 140 $Am^2/kg$ and a ferromagnetic powder having a longer axis length of 0.1 μm or below. Moreover, there exists a ferromagnetic powder having a coercive force exceeding 160 kA/m with a uniform particle size distribution reflected in the coercive force. Thus, a remarkable development can be seen in this field.

It is necessary to uniformly distribute the ferromagnetic powder in a magnetic paint so that the magnetic recording medium can exhibit a preferable electromagnetic conversion property. Actually, however, it becomes more and more difficult to uniformly distribute a ferromagnetic powder of a smaller particle size which satisfies the aforementioned conditions.

In order to cope with such a circumstance, it is considered to increase a time required for kneading or dispersion when preparing a magnetic paint. However, this also causes deterioration of the ferromagnetic powder, decreasing the production efficiency.

On the other hand, it has also been tried that a bonding agent is made to contain a dispersing agent having a particular functional group, so as to increase the interaction with the ferromagnetic powder and improve the dispersibility. However, the dispersing agent presently available cannot sufficiently disperse a fine ferromagnetic powder which has been developed for a high-density recording.

SUMMARY OF THE INVENTION

It is therefore an object of the present invention to provide a magnetic recording medium which can improve dispersibility of a ferromagnetic powder in a magnetic layer even when the ferromagnetic powder has a significantly small particle size, so as to exhibit an excellent electromagnetic conversion property.

The inventors of the present invention, in order to achieve the aforementioned object, examined the circumstance from various points of view and found that an excellent electromagnetic conversion property can be obtained by adding a diketone compound as a dispersing agent into a magnetic layer paint for preparing a paint type magnetic recording medium, thus completing the present invention.

That is, a magnetic recording medium according to the present invention is prepared by painting a non-magnetic support body with a magnetic paint mainly consisting of a ferromagnetic powder and a binding agent, so as to form a magnetic layer, and characterized in that the magnetic layer contains a diketone compound.

As the aforementioned diketone compound, there can be exemplified a diketone compound shown in Chemical Formula 4 given below, a metal chelate compound of the diketone of Chemical Formula 4, and a metal chelate compound of Chemical Formula 5 which has been polymerized.

[Chemical Formula 4]

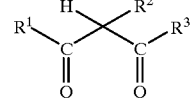

(wherein $R^1$ to $R^3$ are selected from a group consisting of hydrogen, halogen, hydroxyl group, nitro group, carboxyl group, carbonyl group, amino group, amide group, and sulfonic acid group as well as alkyl group, aryl group, hetero-aromatic group replaced therewith.)

[Chemical Formula 5]

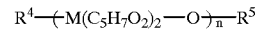

(wherein n is an integer. $R^4$ and $R^5$ are selected from a group consisting of hydrogen halogen hydroxyl group, nitro group, carboxyl group, carbonyl group, amino group, amide group, and sulfonic acid group as well as alkyl group, aryl group, hetero-aromatic group replaced therewith.)

The metal chelate compound of the diketone shown in Chemical Formula 4 may be composed of a metal selected from a group consisting of alkali metals, alkali earth metals, transition metals, as well as Al, Ga, and Sn.

The metal chelate compound shown in Chemical Formula 5 may be composed of a metal M selected from a group consisting of Ti and Zr.

In the diketone compound shown in Chemical Formula 4, the hydrophilic group adsorbs onto a metal atom (ferromagnetic powder). In the metal chelate compound of the diketone shown in Chemical Formula 4 and the metal chelate polymer shown in Chemical Formula 5, some of the diketones are separated and adsorb onto the metal atoms (ferromagnetic powder) and further separated diketones adsorb onto the metal atoms.

Thus, a diketone compound capable of forming a complex with a metal atom functions as a dispersing agent when added into a magnetic layer, improving the dispersibility of the ferromagnetic powder. As a result, a magnetic powder uniformly dispersed can sufficiently exhibit its property, enhancing the electromagnetic conversion property.

Moreover, according to the present invention, a diketone compound rapidly adsorbs to a ferromagnetic powder, and consequently, addition of such a compound increases the speed of dispersion of the ferromagnetic powder, thus reducing the period of time required for the dispersion.

DETAILED DESCRIPTION OF THE PREFERRED EMBODIMENTS

Figure 1:
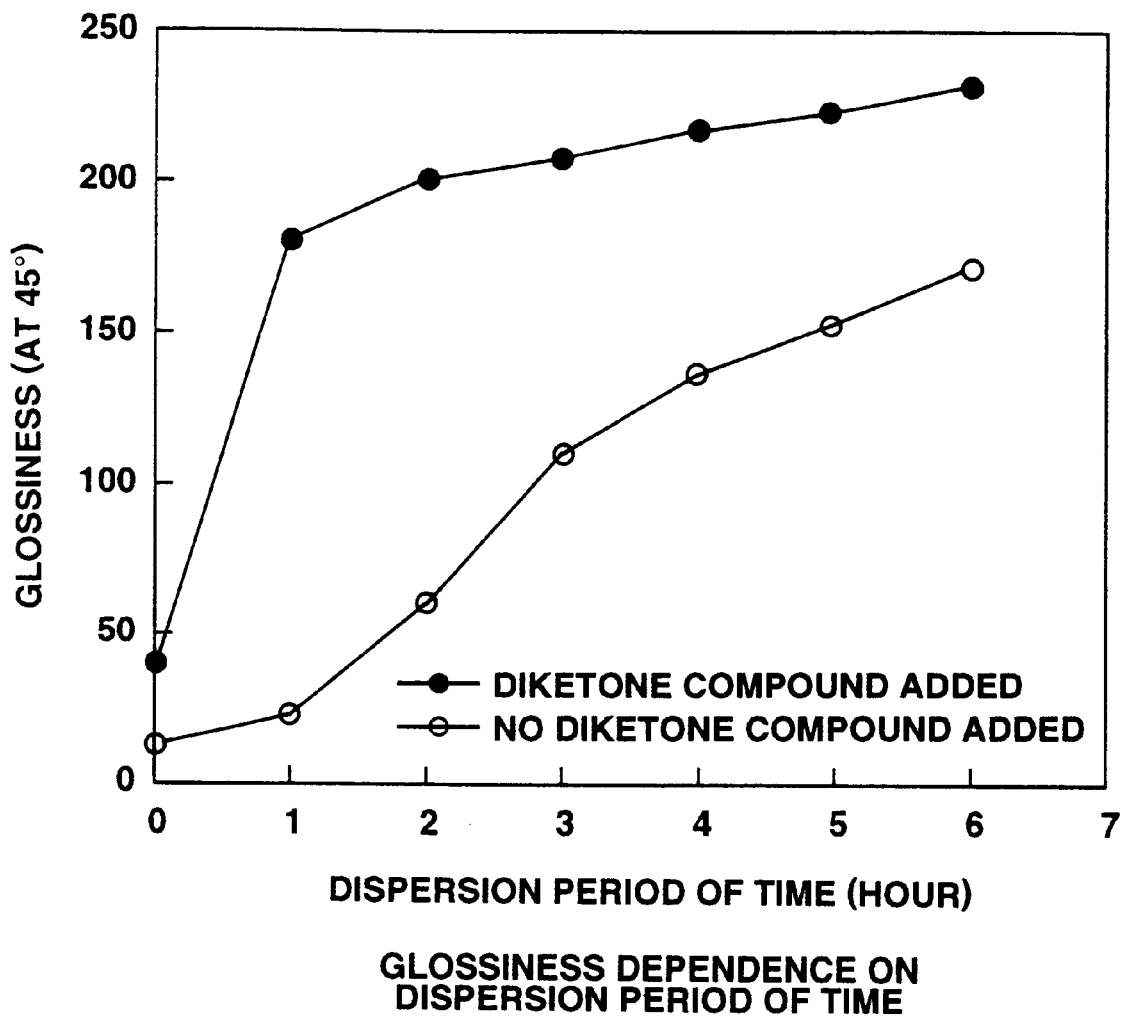
FIG. 1 shows the relationship between the period of time required for dispersing the magnetic paint and the glossiness of the painted film.

Description will now be directed to a magnetic recording medium according to embodiments of the present invention.

The magnetic recording medium according to the present invention is prepared by painting a non-magnetic support body with a magnetic paint mainly consisting of a magnetic powder and a binding agent, so as to form a magnetic layer, and characterized in that the magnetic layer contains a diketone compound.

As the diketone compound used here, there can be exemplified a diketone compound shown in Chemical Formula 6 given below.

[Chemical Formula 6]

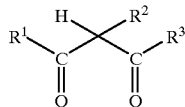

(wherein $R^1$ to $R^3$ are selected from a group consisting of hydrogen, halogen, hydroxyl group, nitro group, carboxyl group, carbonyl group, amino group, amide group, and sulfonic acid group as well as alkyl group, aryl group, hetero-aromatic group replaced therewith.)

Alternatively, the aforementioned diketone compound may be a metal chelate compound of the diketone shown in Chemical Formula 6.

The metal chelate compound of the diketone shown in Chemical Formula 6 may be composed of a metal selected from a group consisting of alkali metals, alkali earth metals, transition metals as well as Al, Ga, and Sn. For example, if the diketone compound shown in Chemical Formula 6 is represented by DK, the obtained compound may expressed as: $Ti(DK)_4$, $Zr(DK)_4$, $Sn(DK)_4$, $Cr(DK)_3$, $Co(DK)_2$, and $Ni(DK)_2$. The coordination number of the metal chelate compound of diketone varies depending on the metal used, and 1 to 4 mols of diketone exist for 1 mol of metal.

Alternatively, the aforementioned diketone compound may be a polymer of the metal chelate compound shown in Chemical Formula 7 given below.

[Chemical Formula 7]

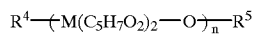

(wherein n is an integer. $R^4$ and $R^5$ are selected from a group consisting of hydrogen, halogen, hydroxyl group, nitro group, carboxyl group, carbonyl group, amino group, amide group, and sulfonic acid group as well as alkyl group, aryl group, hetero-aromatic group replaced therewith.)

The metal M used for polymerization of the metal chelate compound shown in Chemical Formula 7 may be selected from a group consisting of Ti and Zr.

In the polymer of the metal chelate compound shown in Chemical Formula 7, "n" may be any integer equal to or more than 1. It should be noted that if the value of n increases to a large number, the number of molecules contained in a predetermined quantity decreases, and the number of molecules which can adsorb to the ferromagnetic compound decreases. However, as the n increase, the adsorption force to the ferromagnetic powder also increases, simultaneously exhibiting a bridging effect. Consequently, in order to exhibit an excellent dispersion effect, the value of n is preferably as follows: $5 \leq n \leq 30$.

The diketone compound shown in Chemical Formula 6 functions as a dispersing agent as the hydrophilic group adsorbs onto a surface of ferromagnetic powder, improving the dispersibility of the ferromagnetic powder. Moreover, the metal chelate compounds of diketone shown in Chemical Formulae 6 and 7 adsorb onto a surface of the ferromagnetic powder when a part of diketone compound is separated. Also, the separated diketone compound, as has been described, adsorbs onto the ferromagnetic powder. As a result of these reactions, the metal chelate compounds function as a dispersing agent, improving the dispersibility of the ferromagnetic powder.

As has been described above, when these diketone compounds shown in Chemical Formulae 6 and 7 are added to a magnetic layer of a magnetic recording medium, the ferromagnetic powder can sufficiently exhibit property thereof, improving the electromagnetic conversion property.

Moreover, the aforementioned diketone compounds rapidly adsorb to a ferromagnetic powder, and consequently, addition of these compound increases the speed of dispersion of the ferromagnetic powder, thus reducing the period of time required for the dispersion.

Furthermore, a diketone compound which has been separated from a metal chelate has a strong ability to form a complex and accordingly, adsorbs onto a surface of a magnetic head, suppressing generation of an iron oxide which may cause reduction in output power. Consequently, with a magnetic recording medium in which a metal chelate compound of diketone is added, it is possible not only to obtain a high electromagnetic conversion property but also to reduce deterioration of the recorded data reproduction property.

The quantity of the aforementioned diketone to be added is preferably 0.3 to 10 weight parts and more preferably 1.0 to 5.0 weight parts for 100 weight parts of a ferromagnetic or non-magnetic powder. If this range is exceeded, a number of non-reacted reaction groups in the diketone compound remain in the magnetic layer, which interact with a binding agent, decreasing the dispersibility. On the contrary, if the quantity added is less than the aforementioned range, no function as a dispersing agent can be obtained.

When using the diketone compound shown in Chemical Formula 6 or 7, it is possible to use one diketone compound or more than one diketone compounds simultaneously. It is also possible to use these diketone compounds together with other conventional dispersing agents.

The aforementioned magnetic layer is formed by adding to a magnetic paint the diketone compound shown in Chemical Formulae 6 and 7 as dispersing agents, and then applying the paint to a non-magnetic support body, so as to be dried thereon.

More precisely, the aforementioned diketone compound (dispersing agent) is mixed with a ferromagnetic powder and a binding agent, and the mixture is kneaded together with a solvent so as to prepare a magnetic paint. Alternatively, a ferromagnetic powder which has been mixed with the aforementioned diketone compound (dispersing agent) is kneaded together with a binding agent and a solvent so as to obtain a magnetic paint.

As the ferromagnetic powder used for the aforementioned magnetic layer, there can be exemplified a metal such as Fe, Co, and Ni; an alloy such as Fe—Co, Fe—Ni, Fe—Al, Fe—Ni—Al, Fe—Al—P, Fe—Ni—Si—Al, Fe—Ni—Si—Al—Mn, Fe—Mn—Zn, Fe—Ni—An, Co—Ni, Co—P, Fe—Co—Ni, Fe—Co—Ni—Cr, Fe—Co—Ni—P, Fe—Co—B, Fe—Co—Cr—B, Mn—Bi, Mn—Al, and Fe—Co—V; iron nitride; and iron carbide. In order to prevent sintering during deoxidization or to maintain a shape, it is possible to add an adequate quantity of a light metal such as Al, Si, P, and B without deteriorating the effects of the present invention.

Furthermore, as the ferromagnetic powder, there can also be exemplified a berthollide compound of $Fe_3O_4$ and $\gamma\text{-Fe}_2\text{O}_3$, $\text{Fe}_3\text{O}_4$ or $\gamma\text{-Fe}_2\text{O}_3$; a berthollide compound of $\text{Fe}_3\text{O}_4$ and $\text{Fe}_3\text{O}_4$ containing Co, or $\gamma\text{-Fe}_2\text{O}_3$ containing Co; and an oxide of $\text{CrO}_2$ containing one or more than one metal elements such as Te, Sb, Fe, and B. It is also possible to use a hexagonal plate type ferrite such as M-type W-type, Y-type, and Z-type barium ferrite, strontium ferrite, calcium ferrite, lead ferrite. For the purpose of controlling the coercive force, it is possible to add to these compounds Co—Ti, Co—Ti—Zn, Co—Ti—Nb, Co—Ti—Zn—Nb Cu—Zr, Ni—Ti or the like.

Each of these ferromagnetic powders can be used either solely or together with other ferromagnetic powder(s).

Moreover, the ferromagnetic powder used for the present invention preferably has a specific surface of 30 to 80 m²/g, and more preferably 40 to 70 m²/g. When the specific surface is within this range, a high-density recording is enabled as the ferromagnetic powder has a smaller powder size, and it is possible to obtain a magnetic recording medium having an excellent properties in noise characteristic.

Furthermore, the ferromagnetic powder used in the present invention preferably has a longer axis length of 0.05 to 0.50 μm and an axis ratio 2 to 15. If the longer axis has a length less than 0.05 μm, dispersion in the magnetic paint is difficult, whereas if the longer axis has a length exceeding 0.50 μm, the noise characteristic may be deteriorated. If the axis ratio is 2 or less, the coordination of the ferromagnetic powder is lowered and the output is lowered, whereas if the axis ratio exceeds 15, output of a short wave length signal may be lowered. In the case of a plate-type ferrite, it is preferable that the plate diameter be 0.01 to 0.5 μm and the plate thickness be 0.001 to 0.2 μm. The longer axis length, the axis ratio, the plate diameter and the plate thickness are determined by averaging 100 or more than 100 transmission electron microscopic photographs sampled at random.

Moreover, as the binding agent to be contained in the aforementioned magnetic layer, it is possible to use known thermoplastic resin, thermosetting resin, reaction-type resin or the like which are conventionally used in the magnetic recording medium, and the average molecular weight is preferably 5000 to 100,000.

As the thermoplastic resin, there can be exemplified: vinyl chloride, vinyl acetate, vinyl chloride-vinyl acetate copolymer, vinyl chloride-vinylidene chloride copolymer, vinyl chloride-acrylonitrile copolymer, ester acrylate-acrylonitrile copolymer, ester acrylate-vinyl chloride-vinylidene chloride copolymer, vinyl chloride-acrylonitrile copolymer, ester acrylate-vinylidene chloride copolymer, ester methacrylate-vinylidene chloride copolymer, ester methacrylate-vinyl chloride copolymer, ester methacrylate-ethylene copolymer, polyvinyl fluoride, acrylonitrile-butadiene copolymer, polyamide resin, polyvinyl butyral, cellulose derivative (cellulose acetate butyrate, cellulose diacetate, cellulose triacetate, cellulose propionate, nitro cellulose), styrene-butadiene copolymer, polyurethane resin, polyester resin, amino resin, synthetic rubber, and the like.

As the thermosetting resin or the reaction-type resin, there can be exemplified: phenolic resin, epoxy resin, polyurethane thermosetting resin, urea resin, melamine resin, alkyd resin, silicone resin, polyamine resin, uriaformaldehyde resin, and the like.

Moreover, in order to improve dispersibility of a pigment, it is possible to introduce to all of the aforementioned binding agents a polar functional group such as —$SO_3M$ —$OSO_3M$, —COOM, $P=O(OM)_2$ or the like, wherein M is a hydrogen atom or alkali metal such as lithium, potassium, sodium or the like. Furthermore, as the aforementioned polar functional group, there can be exemplified a side chain type having an end group of —$NR^{10}R^{11}$, —$NR^{10}R^{11}R^{12+}X_-$ and a principal chain type >$NR^{10}R^{11+}X_-$, wherein $R^{10}$, $R^{11}$, and $R^{13}$ are hydrogen atoms or hydrocarbon groups; and X is an ion of a halogen element such as fluorine, chlorine, bromine, and iodine, or an inorganic or organic ion. There are also polar functional groups such as —OH, —SH, —CN, and epoxy group. These polar functional groups are to be contained in the quantity of $10^{-8}$ to $10^{-1}$ mol/g, or preferably, $10^{-6}$ to $10^{-2}$ mol/g.

Each of these binding agents can be used either solely or in combination with other one or more than one binding agents. The content of the binding agent in the magnetic layer is to be 1 to 200 weight parts, and preferably 10 to 50 weight parts, for 100 weight parts of the ferromagnetic powder non-magnetic powder. If the content of the binding agent is too large, the relative content of the ferromagnetic powder in the magnetic layer is lowered, which in turn lowers the output. Moreover, plastic flow is easily caused by repeated sliding in the drive, which lowers the running resistance of the magnetic recording medium. On the contrary, when the content of the binding agent is too small, the painted film becomes fragile and the running resistance of the magnetic recording medium is lowered.

Furthermore, it is also possible to employ polyisocyanate for bridge-setting the aforementioned binding agents. As the polyisocyanate, there can be exemplified toluene diisocyanate and additional mass thereof, alkylene diisocyanate and additional mass thereof, or the like. The content of the polyisocyanates to be mixed with the aforementioned binding agents is 5 to 80 weight parts, or preferably 10 to 50 weight parts, for 100 weight parts of the aforementioned binding agents.

As the solvent used when preparing a magnetic paint, there can be exemplified: ketone solvents such as acetone, methylethyl ketone, methylisobutyl ketone, and cyclohexaquinone; alcohol solvents such as methanol, ethanol, and propanol; ester solvents such as methyl acetate, ethyl acetate, butyl acetate, propyl acetate, ethyl lactate, and ethylene glycol acetate; ether solvents such as diethylene glycol dimethyl ether, 2-ethoxyethanol, tetrahydrofuran, and dioxane; aromatic hydrocarbon solvents such as benzene, toluene, and xylene; and hydrocarbon halide solvents such as methylene chloride, ethylene chloride, carbon tetrachloride, chloroform, and chlorobenzene.

Furthermore, if necessary, it is possible to add a lubricant to the aforementioned magnetic layer. As the aforementioned lubricant, there can be exemplified: graphite, molybdenum disulfide, tungsten disulfide, silicone oil, fatty acid with 10 to 22 carbons as well as fatty acid ester composed of alcohol with 2 to 26 carbons, terpene compound as well as oligomer thereof, and the like.

Moreover, if necessary, the aforementioned magnetic layer may contain abrasive particles. As the abrasive particles, there can be exemplified: aluminium oxide (α, β, γ), chrome oxide, silicone carbide, diamond, garnet, emery, boron nitride, titanium carbide, silicone carbide, titanium oxide (rutile, anatase), or the like. These abrasive particles are to be contained in quantity of 20 weight parts or less, or preferably 10 weight parts or less, for 100 weight parts of the ferromagnetic powder. Moreover, it is preferable that these abrasive particles have Moh's hardness as 4 or above, or preferably 5 or above; and specific weight as 2 to 6, or preferably, 3 to 5. The average particle size of the abrasive particles is also determined statistically in the same way as the ferromagnetic powder, by using transmission electron microscope photographs.

Furthermore, the non-magnetic support body of the magnetic recording medium can be made from: polymers represented by polyester such as polyethylene terephthalate and polyethylene-2-6-naphthalate; polyolefin such as polypropylene; cellulose such as cellulose triacetate and cellulose diacetate; vinyl resins; polyimide; and polycarbonate; or metal, glass, and ceramics.

The aforementioned dispersing agents, magnetic powders, binding agents, lubricants, and abrasive particles are used to prepare a magnetic paint, which is painted on a non-magnetic support body and dried so as to form a magnetic layer. The magnetic paint is prepared by the steps of kneading, mixing, and dispersion. The dispersion and kneading are carried out by using a roll mill, ball mill, sand mill, agitator, kneader, extruder, homogenizer, ultrasonic dispersion apparatus, and the like. After a magnetic paint is prepared, the magnetic paint is applied onto a non-magnetic support body by way of blowing or roll painting, and then dried.

The magnetic recording medium according to the present invention is not limited to a particular configuration. For improvement of running efficiency, the antistatic purpose, prevention of copying, or the like, it is also possible to provide a back coating layer on the opposite surface of the non-magnetic support body. Furthermore, if necessary, the magnetic layer may be covered by a top coating layer made from a lubricant or anti-corrosive agent.

Moreover, in order to obtain smoothness of the magnetic layer (upper layer), it is possible to provide a non-magnetic layer (lower layer) made from a non-magnetic powder dispersed in a binding agent, between the magnetic layer and the non-magnetic support body. Generally, this is called a magnetic recording medium of double-layered coating type magnetic recording medium. In the case of this double-layered coating type, the non-magnetic powder used for the non-magnetic layer may be, for example, non-magnetic iron oxide such as $\alpha$-$Fe_2O_3$, goethite, rutile-type titanium oxide, anatase-type titanium oxide, stannum oxide, tungsten oxide, silicone oxide, zinc oxide, chrome oxide, cerium oxide, titanium carbide, BN, $\alpha$-alumina, $\beta$-alumina, $\gamma$-alumina, calcium sulfate, barium sulfate, molybdenum disulfate, magnesium carbonate, calcium carbonate, barium carbonate, strontium carbonate, barium titanate, or the like.

Each of these non-magnetic powders may be used either solely or in combination with other non-magnetic powder (s). Moreover, these non-magnetic powders can be doped with an adequate quantity of impurities according to a purpose. It is also possible to carry out surface processing with a compound of Al, Si, Ti, Sn, Sb, Zr or the like for improving dispersibility, improving electric conductance, granting electric conductivity, improving a color, or the like. The non-magnetic powders preferably have a specific surface as 30 to 80 $m^2/g$, and more preferably, 40 to 70 $m^2/g$.

Moreover, if necessary, there may be contained rubber furnace, pyrocarbon, color black, acetylene black or the like. These carbon blacks preferably have a specific surface as 100 to 400 $m^2/g$, and a DBP (dibutylphthalate) oil absorption as 20 to 200 ml/100 g.

If the non-magnetic powder and the carbon blacks have a specific surface within the aforementioned range, the non-magnetic layer (lower layer) becomes more and more smooth as the particle size becomes smaller, and as a result, the magnetic layer (upper layer) becomes smooth. Consequently, it is possible to obtain a magnetic recording medium having an excellent modulation noise characteristic and the least effect from a spacing loss.

EXAMPLES

Description will now be directed to results of tests which carried out according to the present invention. It should noted that the present invention is not limited to the range these tests.

Producing a Magnetic Recording Medium Including Preparation of a Magnetic Paint

Composition of a magnetic paint:

| | |
|---|---|
| Fe metal ferromagnetic powder (coercive force: 160 kA/m; saturation magnetization: 145 $Am^2/kg$; specific surface: 51 $m^2/g$; longer axis length: 0.08 $\mu m$; needle ratio: 3) | 100 weight parts |
| Polyvinyl chloride resin (trade name MR-110 produced by Nippon Zeon Co., Ltd.) | 14 weight parts |
| Polyesterpolyurethane resin (produced by Toyobo Co., Ltd.) | 3 weight parts |
| Additive ($Al_2O_3$) | 5 weight parts |
| Diketone compound (which Will be detailed later) | 3 weight parts |
| Stearic acid | 1 weight part |
| Heptyl stearate | 1 weight part |
| Methyl ethyl ketone | 150 weight parts |
| Cyclohexane | 150 weight parts |

Firstly, the above-described ferromagnetic powder, binding agent, additive, solvent and dispersing agent (diketone compound) which satisfy the above-described composition are mixed and kneaded by an extrude. After this, the mixture was dispersed by using a sand mill for 6 hours.

Next, the obtained magnetic paint was added with 3 weight parts of polyisocyanate, and applied onto a surface of a base film (polyethylene terephthalate) of 7 $\mu m$ thickness. The painted film was subjected to coordination processing by using a solenoid coil; drying; calendar processing; and curing.

Back paint composition:

| | |
|---|---|
| Carbon black (trade name: Asahi #50) | 100 weight parts |
| Polyester polyurethane (trade name: Nipporan N-2304) | 100 weight parts |
| Methyl ethyl ketone | 500 weight parts |
| Toluene | 500 weight parts |

The back paint of the above-described composition was applied onto the other surface of the base film. The film thus obtained was silt into a width of 8 mm and mounted in a 8 mm cassette, so as to obtain a magnetic tape.

Test 1-1

The diketone compound used as the dispersing agent is shown in Chemical Formula 8 below (realized as samples A-1 to A-9 in Table 1). As shown in Table 1, samples A-1 to A-9 have different functional groups $R^1$, $R^2$, and $R^3$ in Chemical Formula 8. Using these samples, magnetic tapes were prepared according to the aforementioned method.

[Chemical Formula 8]

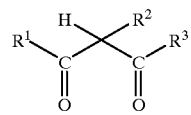

(wherein $R^1$ to $R^3$ are selected from a group consisting of hydrogen halogen hydroxyl group, nitro group, carboxyl group, carbonyl group, amino group, amide group, and sulfonic acid group as well as alkyl group, aryl group, hetero-aromatic group replaced therewith.)

TABLE 1

| Sample No. | $R^1$ | $R^2$ | $R^3$ |
| --- | --- | --- | --- |
| A-1 | $CH_3$ | H | $CH_3$ |
| A-2 | $CF_3$ | H | $CF_3$ |
| A-3 | $CH_2OH$ | H | $CH_2OH$ |
| A-4 | $CH_3$ | $CH_3$ | $CH_3$ |
| A-5 | $CH_3$ | OH | $CH_3$ |
| A-6 | $C_5H_{11}$ | H | $C_5H_{11}$ |
| A-7 | $C_6H_5$ | H | $C_6H_5$ |
| A-8 | $C(CH_3)_3$ | H | $C(CH_3)_3$ |
| A-9 | $C(CH_3)_5$ | H | $C(CH_3)_3$ |

For each of the magnetic tape samples, electromagnetic conversion property and surface roughness were determined.

The electromagnetic conversion property was determined by using a fixed-head type electric characteristic analysis apparatus. This apparatus is composed of a rotational drum and a head which is brought into contact with the drum, onto which a tape is mounted. For actual measurement, firstly, a 10 MHz rectangular wave signal was recorded with an optimal recording current of each of the magnetic tapes, so as to determine an output level of 10 MHz by using a spectrum analyzer. The relative speed between the magnetic tape and the head was set to 3.33 m/s.

The surface roughness was measured by using a non-contact type surface roughness tester based on laser beam interference, so as to determine an average roughness along a center line.

Moreover, in order to determine an optimal quantity to be added, sample A-1 was tested by changing the quantity to be added.

Table 2 shows the results of these tests. Note that a conventional 8 mm tape using the conventional dispersing agent was used as a reference (0 dB). Moreover, a tape using no dispersing agent (diketone compound) was also prepared for comparison.

In Table 2, a circle (o) denotes that the dispersion effect is superior to the reference, whereas a cross (x) denotes that the dispersion effect is inferior to the reference.

TABLE 2

| Sample No. | Weight parts | 10 MHz output (dB) | Surface roughness Ra (nm) | Dispersion effect |
| --- | --- | --- | --- | --- |
| A-1 | 1 | +2.3 | 6.8 | o |
| A-1 | 3 | +2.9 | 6.5 | o |
| A-1 | 5 | +2.7 | 6.7 | o |
| A-1 | 7 | +1.8 | 7.3 | o |
| A-2 | 3 | +2.3 | 6.8 | o |
| A-3 | 3 | +2.9 | 6.5 | o |
| A-4 | 3 | +3.0 | 6.3 | o |
| A-5 | 3 | +3.0 | 6.3 | o |
| A-6 | 3 | +3.2 | 6.1 | o |
| A-7 | 3 | +2.6 | 6.7 | o |
| A-8 | 3 | +3.1 | 6.2 | o |
| A-9 | 3 | +2.9 | 6.5 | o |
| Reference | — | 0 | 8.3 | — |
| No dispersing agent added | 0 | −2.5 | 10.3 | x |
| A-1 | 0.2 | −0.6 | 8.6 | x |
| A-1 | 12 | −0.2 | 8.5 | x |

Test 1-2

For the magnetic paints prepared according to the aforementioned method, the dispersion effect of the ferromagnetic powder was checked as follows. A magnetic paint was sampled from the sand mill at every hour, which was used to form a film with a 2 ml doctor blade. After drying, glossiness of the paint surface was determined. The angle of incidence and the angle of interception were both set to 45°. The test results are shown in FIG. 1.

Figure 2:
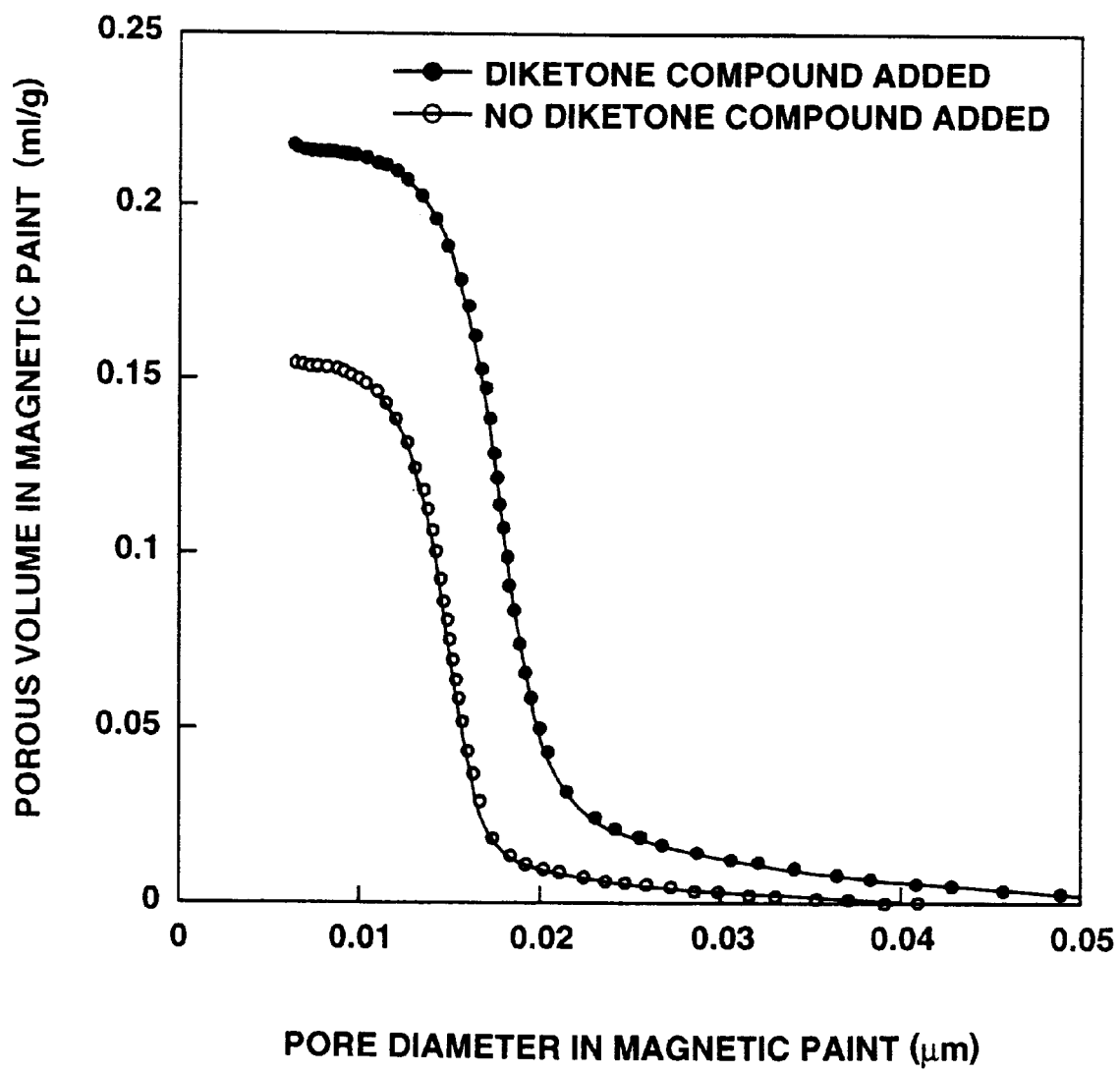
FIG. 2 shows the relationship between the porous volume in the magnetic paint and the pore diameter.

Moreover, the kneading stage was checked as follows. In the magnetic paint kneading step, a porous volume and a pore diameter were determined by using a mercury porosimeter. The results are shown in FIG. 2.

Note that sample A-1 of Table 1 was used for this check, which was compared to a sample not using the dispersing agent (of sample A-1).

Test 2

The diketone compound used as the dispersing agent is a metal chelate compound of the diketone shown in Chemical Formula 9 below (realized as samples B-1 to B-12 in Table 3). As shown in Table 3, samples B-1 to B-12 have different functional groups $R^1$, $R^2$, and $R^3$ in Chemical Formula 9.

Using these samples, magnetic tapes were prepared according to the aforementioned method, so as to check the electromagnetic conversion property and the surface roughness. Moreover, output lowering after 2000 minutes was checked.

Furthermore, in order to determine an optimal quantity to be added, the sample B-1 was checked with various quantities added.

The results of these checks are shown in Table 4. Note that a conventional 8 mm tape using the conventional dispersing agent was used as a reference (0 dB). Moreover, a tape using no dispersing agent (diketone compound) was also prepared for comparison.

[Chemical Formula 9]

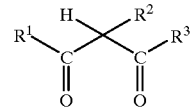

(wherein $R^1$ to $R^3$ are selected from a group consisting of hydrogen halogen hydroxyl group, nitro group, carboxyl group, carbonyl group, amino group, amide group, and sulfonic acid group as well as alkyl group, aryl group, hetero-aromatic group replaced therewith.)

TABLE 3

| Sample No. | M | $R^1$ | $R^2$ | $R^3$ |
| --- | --- | --- | --- | --- |
| B-1 | Ti | $CH_3$ | H | $CH_3$ |
| B-2 | Zr | $CH_3$ | H | $CH_3$ |
| B-3 | Ni | $CH_3$ | H | $CH_3$ |
| B-4 | Sn | $CH_3$ | H | $CH_3$ |
| B-5 | Co | $CH_3$ | H | $CH_3$ |
| B-6 | Cr | $CH_3$ | H | $CH_3$ |
| B-7 | Ti | $C_6H_5$ | H | $CH_3$ |
| B-8 | Ti | $C(CH_3)_3$ | H | $C(CH_3)_3$ |
| B-9 | Ti | $C(CH_3)_3$ | $CH_3$ | $C(CH_3)_3$ |
| B-10 | Ti | H | $CH_3$ | H |
| B-11 | Ti | H | $C_3H_7$ | H |
| B-12 | Ti | $CH_3$ | $CH_3$ | $CH_3$ |

TABLE 4

| Sample No. | Weight parts | 10 MHz output (dB) | Surface roughness Ra (nm) | Output lowering (dB) | Dispersion |
|---|---|---|---|---|---|
| B-1 | 1 | +2.3 | 6.8 | −1.2 | o |
| B-1 | 3 | +2.9 | 6.5 | −0.9 | o |
| B-1 | 5 | +2.7 | 6.7 | −0.7 | o |
| B-1 | 7 | +1.8 | 7.3 | −0.5 | o |
| B-2 | 3 | +2.9 | 6.5 | −0.8 | o |
| B-3 | 3 | +3.0 | 6.3 | −0.9 | o |
| B-4 | 3 | +2.8 | 6.5 | −1.0 | o |
| B-5 | 3 | +2.6 | 6.7 | −1.1 | o |
| B-6 | 3 | +2.5 | 6.8 | −1.3 | o |
| B-7 | 3 | +2.7 | 6.7 | −1.0 | o |
| B-8 | 3 | +3.1 | 6.1 | −0.8 | o |
| B-9 | 3 | +2.9 | 6.5 | −1.1 | o |
| B-10 | 3 | +3.1 | 6.0 | −1.0 | o |
| B-11 | 3 | +3.3 | 5.9 | −0.8 | o |
| B-12 | 3 | +3.3 | 6.0 | −0.8 | o |
| Reference | — | 0 | 8.3 | −4.3 | — |
| None added | 0 | −2.5 | 10.3 | −5.0 | x |
| B-1 | 0.1 | −0.6 | 8.8 | −3.5 | x |
| B-1 | 12 | −0.2 | 8.6 | −3.4 | x |

Test 3

The diketone compound used as the dispersing agent is a polymer of the metal chelate compound (hereinafter, referred to as poly(titanium acetylacetonate) shown in Chemical Formula 10 below (realized as samples C-1 to C-12 in Table 5). As shown in Table 5, samples C-1 to C-12 have different functional groups $R^4$ and $R^5$ and different degrees of polymerization n in Chemical Formula 10.

Using these samples, magnetic tapes were prepared according to the same method as Test 1-1, so as to check the electromagnetic conversion property and the surface roughness.

Furthermore, in order to determine an optimal quantity to be added, the sample B-1 was checked with various quantities added.

The results of these checks are shown in Table 6. Note that a conventional 8 mm tape using the conventional dispersing agent was used as a reference (0 dB). Moreover, following tapes were prepared for comparison: a tape using no dispersing agent (diketone compound); a tape prepared with addition of a compound K-1 (titanate coupling agent) shown in Chemical Formula 11 below; and a tape prepared with addition of a compound K-2 (silane coupling agent) shown in Chemical Formula 12 below.

[Chemical Formula 10]

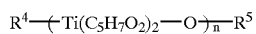

(wherein n is an integer. $R^4$ and $R^5$ are selected from a group consisting of hydrogen halogen hydroxyl group, nitro group, carboxyl group, carbonyl group, amino group, amide group, and sulfonic acid group as well as alkyl group, aryl group, hetero-aromatic group replaced therewith.)

TABLE 5

| Sample No. | Degree of polymerization n | $R^4$ | $R^5$ |
|---|---|---|---|
| C-1 | 15 | $H_3CO-$ | $-CH_3$ |
| C-2 | 5 | $H_3CO-$ | $-CH_3$ |
| C-3 | 10 | $H_3CO-$ | $-CH_3$ |
| C-4 | 20 | $H_3CO-$ | $-CH_3$ |
| C-5 | 30 | $H_3CO-$ | $-CH_3$ |
| C-6 | 15 | $H_3CO-$ | $-(CH_3)_2CH$ |
| C-7 | 15 | $(CH_3)_2CH-$ | $-(CH_3)_2CH$ |
| C-8 | 15 | $H_3CO-$ | $-H$ |
| C-9 | 15 | $HO-$ | $-H$ |
| C-10 | 15 | $H_3CO-$ | $-C_5H_7O_2$ |
| C-11 | 15 | $C_5H_7O_2-$ | $-C_5H_7O_2$ |
| C-12 | 50 | $H_3CO-$ | $-CH_3$ |
| K-1 | | Chemical Formula 11 | |
| K-2 | | Chemical Formula 12 | |

[Chemical Formula 11]

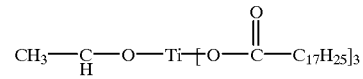

[Chemical Formula 12]

TABLE 6

| Sample No. | Weight parts | 10 MHz output (dB) | Surface roughness Ra (nm) | Dispersion effect |
|---|---|---|---|---|
| C-1 | 1 | +1.2 | 7.9 | o |
| C-1 | 3 | +3.1 | 6.5 | o |
| C-1 | 5 | +3.0 | 6.7 | o |
| C-1 | 7 | +2.2 | 7.7 | o |
| C-1 | 10 | +1.2 | 8.1 | o |
| C-2 | 3 | +2.4 | 7.5 | o |
| C-3 | 3 | +2.7 | 7.2 | o |
| C-4 | 3 | +3.0 | 6.8 | o |
| C-5 | 3 | +2.5 | 7.3 | o |
| C-6 | 3 | +3.1 | 6.8 | o |
| C-7 | 3 | +3.0 | 6.9 | o |
| C-8 | 3 | +3.2 | 6.6 | o |
| C-9 | 3 | +3.2 | 6.6 | o |
| C-10 | 3 | +3.3 | 6.3 | o |
| C-11 | 3 | +3.2 | 6.4 | o |
| C-12 | 3 | −2.1 | 10.0 | x |
| K-1 | 3 | +0.5 | 8.3 | x |
| K-2 | 3 | +1.3 | 8.4 | x |
| Reference | — | 0 | 8.5 | — |
| Non added | 0 | −2.5 | 10.3 | x |
| C-1 | 0.1 | −0.6 | 8.8 | x |
| C-1 | 15 | −1.2 | 9.5 | x |

Evaluation of the Properties

From the above-described tests, the following dispersion effects were confirmed.

Table 2 shows that the magnetic tape prepared with addition of diketone compounds shown in Chemical Formula 8 as a dispersion agent (samples A-1 to A-9) have a smooth surface and superior electromagnetic conversion characteristic when compared to the sample prepared without addition of the diketone compound and the reference sample using the conventional dispersion agent.

Note that variation of R1 to R3 in Chemical Formula 8, which is realized in samples A-1 to A-9, does not bring about a significant change in obtaining preferable values of properties.

Moreover, Table 2 shows that in order to obtain a dispersion effect, the preferable quantity of the diketone compound (samples A-1) to be added is in the range from 0.3 to 10 weight parts for 100 weight parts of the ferromagnetic powder. Especially when the quantity is in the range from 3 to 5 weight parts, a remarkable dispersion effect can be obtained. When the quantity of the diketone added is smaller than the aforementioned range, no dispersion effect can be obtained. When the quantity of the diketone added exceeds the aforementioned range, functional groups which have not reacted interact with each other and the dispersion is lowered, which brings about lowering of the output and deterioration of the surface roughness.

Furthermore, FIG. 1 shows that the magnetic paint containing diketone compound as a dispersing agent (sample A-1) exhibits a higher glossiness compared to a magnetic paint containing non diketone compound as the dispersing agent. As the glossiness becomes higher, the dispersion speed is higher. Thus, by adding the diketone compound as a dispersing agent to a magnetic paint, it is possible to increase the speed of dispersion of the ferromagnetic powder and consequently, to reduce the period of time required for preparing a magnetic paint.

FIG. 2 shows that the magnetic paint containing the diketone compound (A-1) have a smaller porous volume and a smaller pore diameter compared to the reference sample. This test result shows that the diketone compound as a dispersing agent improves the kneading of the ferromagnetic powder. The improvement in the kneading of the magnetic paint leads to a magnetic recording medium having an excellent electromagnetic conversion property.

Similarly, Table 4 shows that the magnetic tape prepared with addition of the metal chelate compounds of diketone shown in Chemical Formula 9 (B-1 to B-12) has a smooth surface and exhibits an excellent electromagnetic conversion property.

On the contrary, the magnetic tape containing no diketone compound and the reference sample using the conventional dispersing agent did not show any improvement in the dispersibility of the ferromagnetic powder and in the surface roughness.

Furthermore, the magnetic tape containing the metal chelate compound of diketone (B-1 to B-12) shows a smaller output lowering after 2000 hours running compared to the magnetic tape containing no metal chelate compound of diketone. This is because the diketone compound suppresses generation of iron oxide which attaches onto the magnetic head.

As can be understood from the results of Table 4, any one of the metals Ti, Zr, Ni, Sn, Co, and Cr can be used so as to compose the metal chelate compound of diketone, i.e., the metal can be selected from a group consisting of alkali metals, alkali earth metals, transition metals and Al, Ga, and Sn.

Samples B-1 to B-12 show that variation of the functional groups R1 to R3 in Chemical Formula 9 does not bring about any remarkable change in obtaining preferable values of properties.

Furthermore, the quantity of the metal chelate compound of diketone to be added (B-1) as a dispersing agent is preferably in the range from 0.3 to 10 weight parts for 100 weight parts of the ferromagnetic powder. Especially when the quantity is 3 to 5 weight parts, a remarkable dispersion effect can be seen. When the quantity of the metal chelate compound of diketone added is below the aforementioned range, no dispersion effect can be exhibited.

Similarly, as can be seen from Table 6, the magnetic tapes (C-1 to C-11) containing poly(titanium acetylacetonate0 shown in Chemical Formula 10 as a dispersing agent have a smooth surface and exhibit an excellent electromagnetic conversion property.

On the contrary, the magnetic tape containing no diketone compound and the reference sample containing the conventional dispersing agent did not show almost any improvement in the dispersibility of the ferromagnetic powder as well as in the output and the surface roughness.

However, even when the acetylacetonate structure is contained, if the degree of polymerization n is too high such as sample C-12, the smoothness is insufficient and the output is also too low. As the degree of polymerization increases, the adsorption to the ferromagnetic is increased, but the number of molecules per unit weight is decreased. Thus, the degree of polymerization n has an optimal value, and preferable results can be obtained around n=15.

Note that, as shown by samples C-1 to C-11, variation of the functional groups R4 and R5 in Chemical Formula 10 does not bring about any remarkable change in obtaining preferable values of properties.

Moreover, Table 4 shows that the quantity of poly (titanium acetylacetonate) (C-1) to be added for a dispersing effect is preferably in the range from 0.3 to 10 weight parts for 100 weight parts of the ferromagnetic powder. Especially when the quantity is 3 to 5 weight parts, a remarkable dispersion effect can be obtained. When the quantity of poly(titanium acetylacetonate) is less than the aforementioned range, no effect as a dispersing agent can be obtained.

For the dispersing speed and the kneading of the magnetic paint containing the diketone compound shown in Chemical Formulae 9 and 10, similar results are obtained as FIG. 1 and FIG. 2. That is, the magnetic paints containing the diketone compound shown in Chemical Formulae 9 and 10 can also carry out dispersion rapidly and preferably, thus reducing the period of time required for preparing the magnetic paints as well as enhancing the electromagnetic conversion property.

As has thus far been described, when the diketone compounds shown in Chemical Formulae 8, 9. and 10 added to the magnetic layer, the hydrophilic groups thereof adsorbs onto the surface of the ferromagnetic powder, functioning as a dispersing agent and enhancing the dispersibility of the ferromagnetic powder. The ferromagnetic powder which has been uniformly dispersed can exhibit sufficiently exhibit properties thereof, enhancing the electromagnetic conversion property. Moreover, because these compounds rapidly adsorb to the ferromagnetic powder, addition of such a compound increases the dispersion speed of the ferromagnetic powder, which reduces the period of time required for dispersion.

As can be understood from the above description, the magnetic recording medium according to the present invention is prepared with addition of a diketone compound in the magnetic layer and is capable of uniformly dispersing a ferromagnetic powder, which enhances the production efficiency and the electromagnetic conversion property compared to the conventional magnetic recording medium.

What is claimed is:

1. A magnetic recording medium comprising a magnetic paint comprising a ferromagnetic powder, a binding agent, and from about 1 to about 10 parts by weight per 100 parts by weight of said ferromagnetic powder of a diketone compound as a dispersing agent, said magnetic paint applied so as to form a magnetic layer on a non-magnetic body, said diketone compound is a metal chelate compound of a diketone shown in Chemical Formula 2 below:

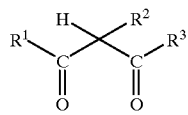

wherein $R^1$ to $R^3$ are selected from the group consisting of hydrogen, halogen, hydroxyl group, nitro group, carboxyl group, carbonyl group, amino group, amide group, sulfonic acid group, alkyl groups, aryl groups, and hetero-aromatic groups; and the metal of the chelate compound is selected from the group consisting of Ti, Zr, Ni, Sn, Co, and Cr.

2. A magnetic recording medium as claimed in claim 1, wherein said ferromagnetic powder has a specific surface area of 30 to 80 m$^2$/g.

3. A magnetic recording medium as claimed in claim 1, wherein said ferromagnetic powder has a longer axis length of 0.05 to 0.50 μm and an axis ratio of 2 to 15.

4. A magnetic recording medium comprising a magnetic paint comprising a ferromagnetic powder, a binding agent, and from about 1 to about 10 parts by weight per 100 parts by weight of said ferromagnetic powder of a diketone compound as a dispersing agent, said magnetic paint applied so as to form a magnetic layer on a non-magnetic body, said diketone compound is a polymer of a metal chelate compound shown in Chemical Formula 3 below:

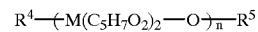

wherein n is an integer; and $R^4$ to $R^5$ are selected from the group consisting of hydrogen, halogen, hydroxyl group, nitro group, carboxyl group, carbonyl group, amino group, amide group, sulfonic acid group, alkyl groups, aryl groups and hetero-aromatic groups; and wherein said polymer of the metal chelate compound is composed of a metal m selected from a group consisting of Ti and Zr.

5. A magnetic recording medium as claimed in claim 4, wherein said polymer of metal chelate compound has a value of n in a range: $5 \leq n \leq 30$.

* * * * *